United States Patent Office 3,323,610
Patented June 6, 1967

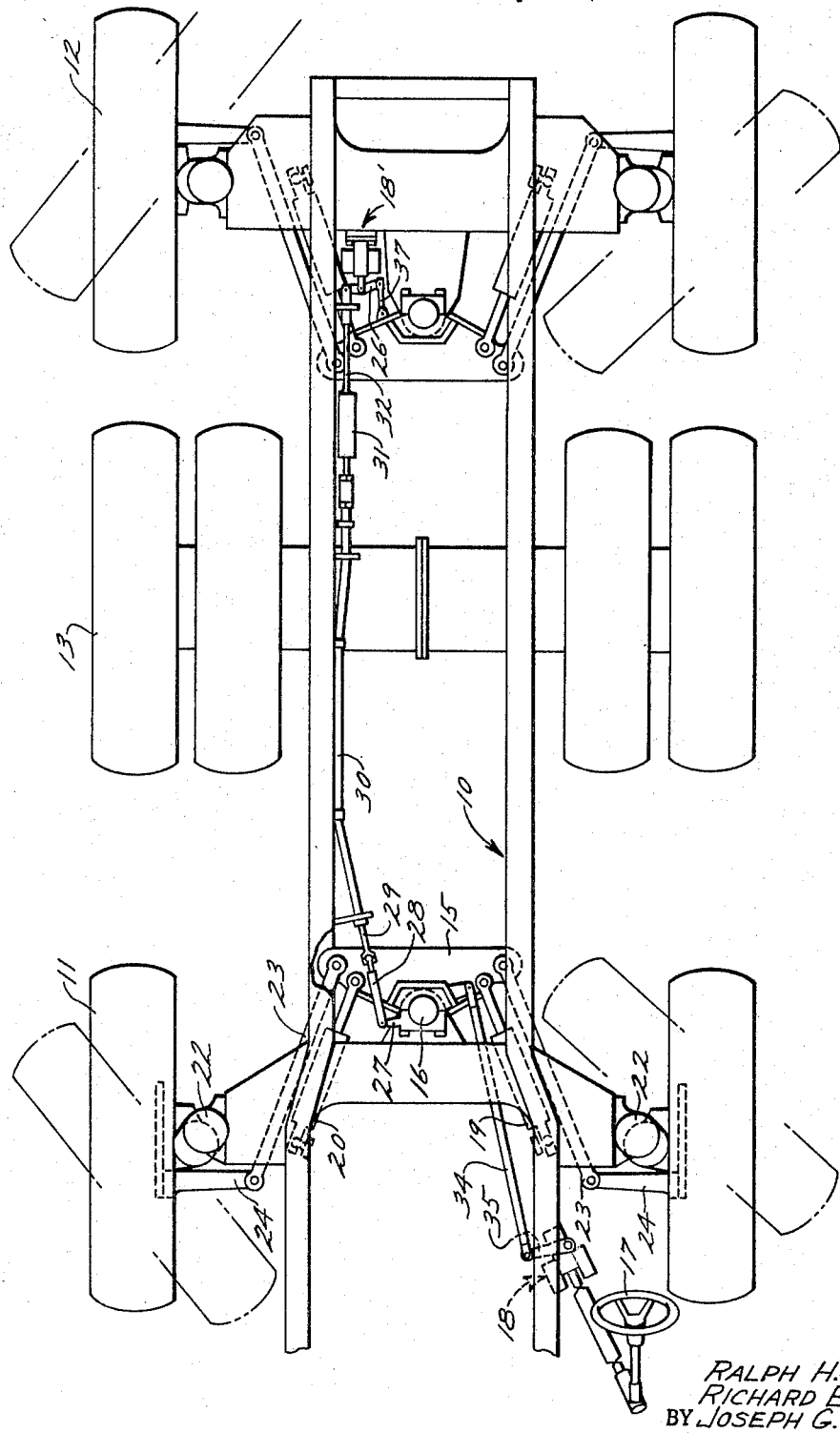

3,323,610
HYDRAULIC STEERING OF FORWARD AND
REAR VEHICLE WHEELS
Ralph H. Kress, Peoria, Richard E. Guhl, Marquette
Heights, and Joseph G. Klecker, Peoria, Ill., assignors
to Caterpillar Tractor Co., Peoria, Ill., a corporation
of Illinois
Filed Sept. 22, 1965, Ser. No. 489,150
3 Claims. (Cl. 180—79.2)

ABSTRACT OF THE DISCLOSURE

Steering mechanism for the forward and rear wheels of a vehicle in which both sets of wheels have substantially identical hydraulic steering devices and control valves therefor and in which a manually actuated steering wheel actuates a control valve for one pair of wheels and a mechanical linkage connects a moving part for said one pair of wheels to the control valve of the other pair of wheels for causing simultaneous steering movement thereof.

It is common practice to steer large vehicles with the aid of hydraulic motors or cylinders under control of steering valves which are in turn controlled by a steering wheel. The steering valve is also under control of follow-up linkage connected between the valve and a steered component to give the powered steering mechanism the same operational sequence as ordinary manual steering. For example, in manual steering, movement of a steering wheel through a given angle effects movement of the steered wheels through a finite angle. In powered steering movement of the steering wheels opens a valve to direct fluid pressure to a steering jack or cylinder which tends to move the steered wheels continuously until the valve is closed. The follow-up linkage referred to operates to close the valve when the wheels have been steered to an angle commensurate with the angle to which the steering wheel has been moved.

Another feature commonly used in power steering with hydraulic jacks is a mechanical linkage connected between and correlating the steering movement of two wheels so that perfect steering is accomplished without relying upon absolute synchronism between two separate jacks and hydraulic systems, each associated with one of the wheels.

It is the object of the present invention to provide means for connecting two separate power steering mechanisms of conventional type to effect simultaneous operation of two sets of steerable wheels on the same vehicle and to provide suitable follow-up means for both, and safety means for the protection of interconnecting linkage when one set of wheels is steered by external forces. Further objects and advantages of the present invention and the manner in which the invention is carried into practice are made apparent in the following specification, wherein reference is made to the accompanying drawing.

The drawing is a schematic plan view of the frame and running gear of a truck showing front and rear wheels equipped with steering mechanism embodying the present invention.

In the drawing a frame generally indicated at 10 is provided with front wheels 11, rear wheels 12 and a set of intermediate dual wheels 13. The dual wheels are, in the particular truck chassis shown, drive wheels driven by a motor and drive gearing, not shown, the motor being disposed forwardly of the frame 10. The front wheels 11 and rear wheels 12 are steerable through mechanism to be described, and are simultaneously moved in opposite directions as illustrated in broken lines so that the truck can be steered on smaller radius than is possible by steering with only one set of wheels.

The steering mechanism for both sets of wheels is conventional, and that for the front set of wheels will be described only in sufficient detail to enable a clear understanding of the present invention which relates particularly to means for operatively interconnecting the forward and rearward steering mechanisms. A steering arm shown at 15 is pivotally mounted with respect to the frame as at 16 and is adapted to be swung in opposite directions through manipulation of the vehicle steering wheel 17. Turning of the wheel actuates a valve and gear box, generally indicated at 18, which is of conventional and well-known manufacture and serves the purpose of directing hydraulic fluid under pressure through hydraulic circuits, not shown, to a pair of steering jacks 19 and 20 pivoted to the vehicle frame and having extensible rods pivoted to the steering arm 15. Rotation of the steering wheel 17 in one direction supplies fluid to one end of the jack 19 and to the opposite end of the jack 20 to effect angular movement of the steering arm 15 about its pivotal support 16. Reverse angular movement is obtained by rotation of the steering wheel in the opposite direction. Angular movement of the steering arm 15 causes angular or steering movement of the front wheels 11 about their pivotal support 22 through tie rods 23, pivotally connected between the steering arm and steering brackets 24 on the wheels.

The steering mechanism for the rear wheels 12 is identical to that just described, but disposed in a reverse position and with the steering valve and gear box 18 disposed at 18′ rather than in a position to be actuated by the steering wheel. Steering of the rear wheels is accomplished through linkage which connects the steering arm 15 with the valve 18′ and translates angular movement of the steering arm 15 to actuating movement of the valve 18′ through a lever 26 which is connected to the valve spool. The linkage comprises an arm 27 adjacent the pivot 16 of the steering arm 15, which arm 27 is connected by a link 28 to a flexible cable 29 guided in tubing 30 and connected with a resilient link 31 and a rod 32 leading to the lever 26. Consequently, upon actuation of the steering wheel to turn the front wheels 11, the linkage described actuates the valve 18′ to cause opposite steering at an equal angle of the rear wheels 12. The resilient link 31 is not disclosed in detail, but is of a well known type which includes a coil spring permitting extension or compression under forces greater than those necessary to perform the normal functions of the linkage. Its purpose is to protect the linkage upon steering movement of only one set of wheels due to external causes, such as rocks or uneven terrain.

As previously mentioned, power steering mechanisms of the type described require follow-up linkage to close the steering valve when the angle of the wheels is commensurate with the angle to which the steering wheel has been turned. Conventional follow-up linkage is shown in connection with the forward steering mechanism as comprising a link 34 pivotally connected between the steering arm 15 and a lever 35 which functions to close the valve 18 upon movement of the steering arm 15 in either direction to an angle comparable to the steering angle of the steering wheel 17. This is accomplished in the rear wheel steering mechanism by a short link 37 connected to the lever 26 at the end opposite to its connection with the linkage leading from the forward steering arm.

We claim:
1. In a vehicle having two sets of steerable wheels a substantially identical hydraulic steering mechanism for each set of wheels, said mechanisms including like con- trol valves, a steering wheel for actuating the steering mechanism control valve for one set of wheels, and mechanical linkage means connecting a movable part of said last mechanism to the steering mechanism control valve of the other set of wheels to cause simultaneous steering of both sets of wheels in response to actuation of said steering wheel.

2. The combination of claim 1 in which each steering mechanism includes a steering valve and each mechanism has follow-up linkage between a moving part thereof and the steering valve to close the valve after it has been opened in response to steering movement of the steering wheel and when the steered vehicle wheels have assumed an angle commensurate with that of the steering wheel.

3. The combination of claim 1 in which the means for operatively connecting the steering mechanism of two sets of wheels includes a resilient link to absorb shock incurred by one set of wheels from an external source.

References Cited

UNITED STATES PATENTS

| | | | |
|---|---|---|---|
| 2,783,849 | 3/1957 | Armington et al. | 180—79.2 |
| 2,916,099 | 12/1959 | Bergmann et al. | 180—79.2 |
| 3,075,784 | 1/1963 | Beyerstedt | 280—91 |
| 3,092,201 | 6/1963 | Biek | 180—79.2 |
| 3,099,460 | 7/1963 | Sheehan | 180—79.2 |
| 3,185,245 | 5/1965 | Hoyt | 180—79.2 |
| 3,202,238 | 8/1965 | Strader | 180—79.2 |

BENJAMIN HERSH, *Primary Examiner.*

J. H. BRANNEN, *Assistant Examiner.*